Nov. 4, 1969   J. O. MORTLOCK ET AL   3,475,913
FLUID FLOW REVERSERS

Filed June 28, 1967   3 Sheets-Sheet 1

INVENTORS
JAMES OSWALD MORTLOCK
WILLIAM HERBERT LONDON
WILLIAM SHAW

By
Cushman, Darby & Cushman
Attorneys

Nov. 4, 1969    J. O. MORTLOCK ETAL    3,475,913
FLUID FLOW REVERSERS

Filed June 28, 1967    3 Sheets-Sheet 3

INVENTORS
JAMES OSWALD MORTLOCK
WILLIAM HERBERT LONDON
WILLIAM SHAW

BY Cushman, Darby & Cushman
Attorneys

United States Patent Office 3,475,913
Patented Nov. 4, 1969

3,475,913
FLUID FLOW REVERSERS
James Oswald Mortlock, Derby, William Herbert London, Watnall, and William Shaw, Derby, England, assignors to Rolls-Royce Limited, Derby, England, a British company
Filed June 28, 1967, Ser. No. 649,525
Claims priority, application Great Britain, Feb. 4, 1967, 5,477/67
Int. Cl. F02k *3/06*
U.S. Cl. 60—229       11 Claims

ABSTRACT OF THE DISCLOSURE

A trust reverser has a casing provided with inner and outer flaps which are movable between an inoperative position, in which they merge into the casing, and an operative position, in which they extend outwardly of the casing and direct to gases upstream.

---

This invention concerns a fan thrust reverser, e.g. for a gas turbine engine.

According to one aspect of the present invention there is provided a fan thrust reverser for a jet propulsion plant comprising a double walled casing, an inner casing spaced therefrom and defining an annular duct therebetween, a plurality of angularly spaced apart groups of radially aligned inner and outer thrust reverser flaps forming part of said double walled casing, the flaps of each said group being pivotally mounted adjacent their downstream ends and being movable between an inoperative position, in which they are disposed substantialy parallel to each other and merge into the remaining part of the double walled casing to provide portions of the inner and outer walls thereof respectively, and an operative position in which their upstream ends respectively lie radially inwardly and outwardly of the said inner and outer walls and open a peripheral gap in the double walled casing, said inner flaps extending across the annular duct and substantially completely obstructing the same so that a gas stream passing downstream through the annular duct will pass through the peripheral gap in the double walled casing and will be deflected upstream by the flaps, a common ring member which is mounted for axial movement, and means for moving the ring member axially to move the flaps between the inoperative and operative positions.

Each pair of flaps may be provided with a respective hydraulic or pneumatic ram for moving the flaps between the said inoperative and operative positions.

Alternatively, the means for moving the flaps may comprise air motors or recirculating ball screw and nut mechanisms.

The said double walled casing may be that of a fan mounted concentrically about and driven by a gas turbine engine said inner casing being that of the gas turbine engine. Thus, the fan may be a front fan.

The upstream portions of the inner flaps may be provided with sealing means which are adapted to effect a seal with the inner casing when the inner flaps are in the operative position. Thus the sealing means may comprise strips of rubber or other flexible material.

There may be a sealing device to exclude fluid from the space between the walls of the double walled casing upstream of the said flaps. Thus the sealing device may be a flexible bellows.

According to another aspect of the present invention, there is provided a thrust reverser comprising a double walled casing, a plurality of angularly spaced apart groups of radially aligned inner and outer thrust reverser flaps forming part of said casing, the flaps of each said group being pivotally mounted adjacent their downstream ends and being movable between an inoperative position, in which they are disposed substantially parallel to each other and merge into the remaining part of the casing to provide portions of the inner and outer walls thereof respectively, and an operative position in which their upstream ends respectively lie radially inwardly and outwardly of the said inner and outer walls and open a peripheral gap in the casing so that a gas stream passing downstream through the casing will pass through the peripheral gap and will be deflected upstream by the flaps, and two separate means for respectively moving the inner and outer flaps between the inoperative and operative positions.

Preferably, each said group comprises a single inner flap and a plurality of outer flaps.

Baffle means may be mounted at the lower portion of the peripheral gap to deflect the gas stream to the side.

The upstream portions of the inner flaps may be adapted to pivot relative to the downstream portions thereof.

The invention is illustrated, merely by way of example, in the accompanying drawings, in which.

Figure 1:
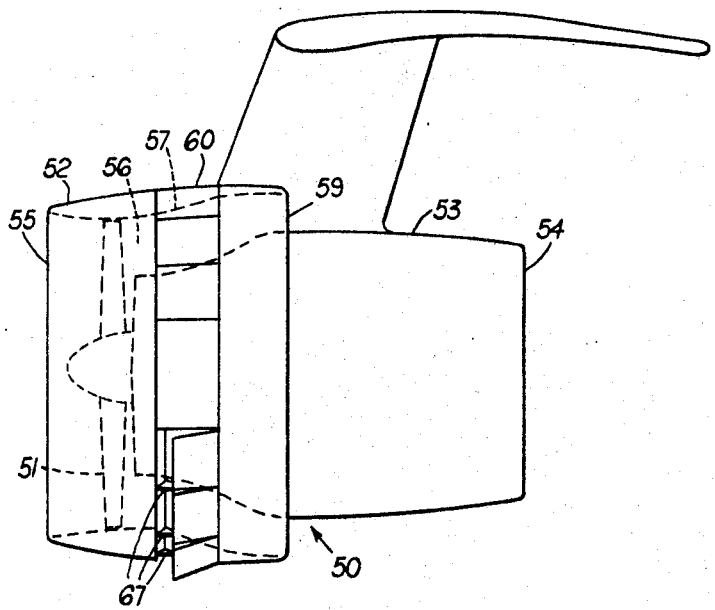
FIGURE 1 is a diagrammatic view of a gas turbine front fan engine provided with a thrust reverse according to the present invention.

In FIGURE 1 there is shown a front fan gas turbine engine 50 having fan blades 51 surrounded by a double walled casing or cowl 52. Mounted coaxially with respect to the fan blades 51, but radially spaced therefrom are a compressor, combustion equipment and a turbine which are disposed in flow series within an engine casing 53 which is provided at its downstream end with an exhaust nozzle 54. Air is entrained through an air intake 55 and is then divided into two separate flows.

One flow passes through the radially inner portion of fan blades 51 to the compressor, and thence to the combustion equipment where it is mixed with fuel supplied from a source not shown, and the mixture burnt. The resulting gases are then expanded through the turbine and through the exhaust nozzle 54.

The second flow is directed through the radially outer portion of the fan blades 51 into a duct 56 which is defined between the inner wall 57 of the cowl 52 and the casing 53, this flow being finally ejected through a fan exhaust nozzle 59.

The cowl 52 has an outer wall 60. The walls 57, 60 are respectively provided with a plurality of equi-spaced, circumferentially arranged apertures 61, 62 (see FIGURE 2), whereby under certain conditions, air flowing through the duct 56 may be radially outwardly ejected to atmosphere. Flaps 63, 64, which are pivotally mounted within said apertures, have pivots 65, 66 arranged at the downstream ends of the flaps 63, 64 respectively. The pivots 65, 66 are arranged transverse to the engine axis and are supported at their opposite ends by struts 67 extending axially betwen the walls 57, 60.

A plurality of rams or the like 58 are mounted between the walls 57, 60 upstream of the flaps 63, 64, the rams 58 being equi-angularly spaced about the engine axis. The rams 58 are connected via rods 68 to a ring member 69. The ring member 69 is mounted for axial movement, the ring member 69 being provided with rollers 70 which are located on fixed circumferentially spaced parallel rails 71.

A connection is provided between the ring member 69 and each of the flaps 63, 64, this connection comprising a link 72 pivotally attached at one end to the ring member 69 and at the other end to the respective inner surfaces of flaps 63, 64.

Each of the links 72 passes through a slot 73 in a bulkhead 74. The bulkheads 74 form the upstream boundaries of the apertures 61, 62. The arrangement is such that those links 72 associated with any two radially aligned flaps 63, 64, pass through the same slot 73.

Flexible bellows or the like 75 are placed between and connected to the ring member 69 and the bulkhead 74 in such a manner that air cannot enter the space between walls 57, 60, upstream of the apertures 61, 62.

Figure 2:
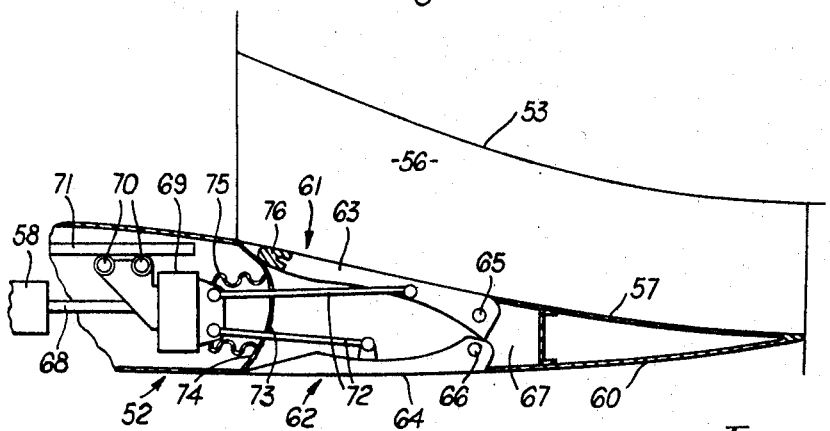
FIGURES 2 and 4 are two different axial part-sections through the thrust reverser of FIGURE 1.

When an aircraft which is powered by an engine 50 is required to fly forwardly, the flaps 63, 64 will be in the position shown in FIGURE 2 so that part of the air taken in by the air intake 55, after flowing through the fan blades 51, will continue to flow in a downstream direction until ejected from fan exhaust nozzle 59, thereby augmenting the thrust obtained from the expansion of burnt air/fuel mixture passing through the exhaust nozzle 54.

Figure 3:
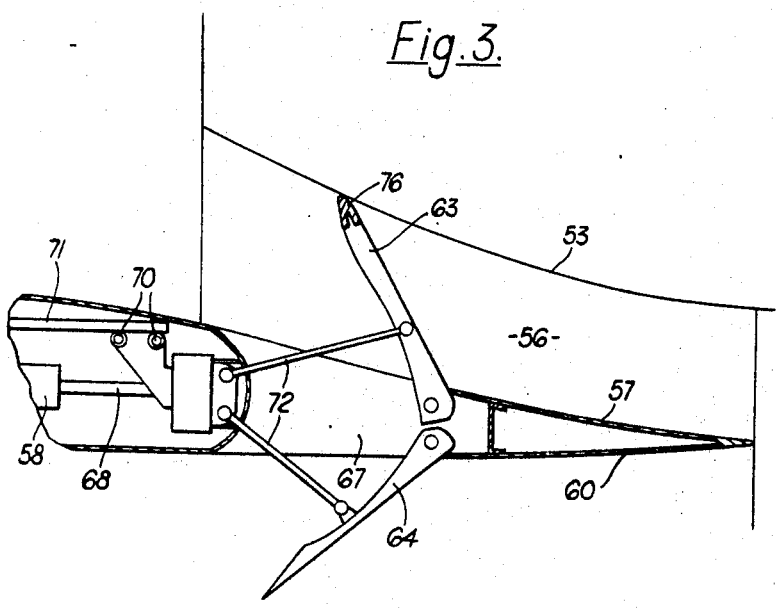
FIGURE 3 is a view similar to FIGURE 2 but with the parts thereof in the reverse thrust position.

When the aircraft is landing, however, its forward speed is required to be rapidly retarded and it is at this point that reverse thrust is brought into operation. The rams or the like 58 are actuated, causing the rods 68 to push the ring member 69 in a downstream direction. The downstream movement of the ring member 69 is transmitted to the flaps 63, 64, via the links 72, causing the flaps 63, 64 to pivot away from each other, until they adopt a position as shown in FIGURE 3, wherein the flaps 63 block-off the duct 56, and the flaps 64 direct the resulting radially outwardly flowing air in a substantially forward direction, thus providing a braking effect on the aircraft.

Flexible sealing members 76, which are constituted by strips of rubber or other flexible material, attached to the upstream lips of flaps 63, press on to the engine casing 53 when flaps 63 are in their operative, i.e., their reverse thrust position, thus improving the sealing effect of the flaps 63, 23.

When it is so desired, the rams 58 are actuated so as to retract the flaps 63, 64 to their original positions, flush with the respective surfaces of the cowl 52.

Figure 4:
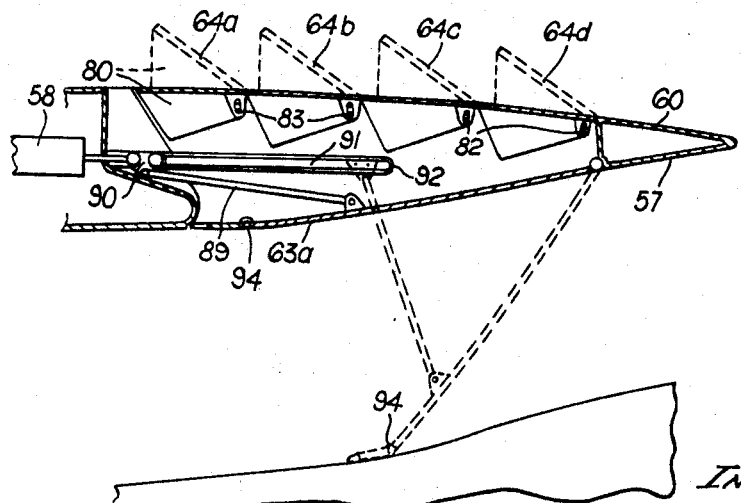
Figure 5:
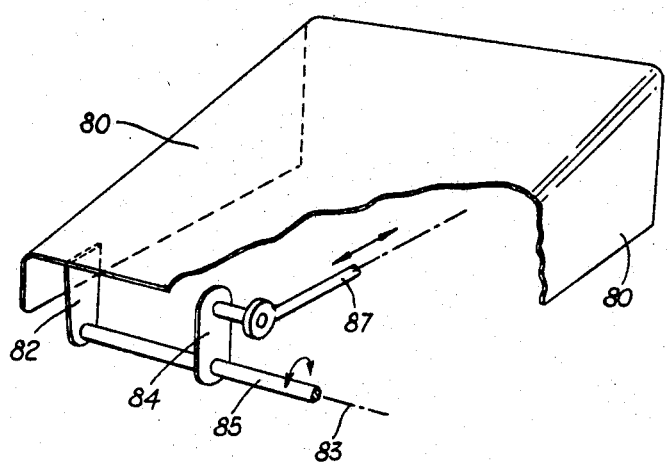
FIGURE 5 is a perspective view of part of the structure of FIGURE 4.

FIGURES 4 and 5 illustrate a further embodiment wherein each of the flaps 64 are divided into a plurality of axially arranged smaller flaps 64a, 64b, 64c and 64d. Each of these smaller flaps is provided with two side walls 80. The side walls 80 control the expansion of the air through the nozzle which is formed therein. Thus more thrust is obtained from the reversed air flow for a given mass flow through the fan blades 51.

The flaps 64a, 64b, 64c and 64d provided with brackets 82 on their downstream, undersides whereby these flaps are pivotally attached to fixed structure, the pivot axes 83 being arranged transverse to the engine axis. Levers 84 are rigidly connected at one end to a bar 85 which extends along the pivot axis 83, the brackets 82 being connected to the bar 85. The ends of the levers 84 remote from the bar 85 are pivotally connected via links 87, which are mounted in series to a first actuating means (not shown) which may be rams, air motor or recirculating ball screw and nut mechanisms or the like, said first actuating means being mounted within the space bounded by walls 57, 60 upstream of the flaps. Thus operation of the said first actuating means exerts a pushing movement in a downstream direction, along the links 87 and through said other ends of the levers 84 causing them to rotate and, in doing so, causing the bars 85 to rotate and thus the flaps 64a, 64b, 64c and 64d to pivot simultaneously into the open position depicted by dotted lines in FIGURE 4.

Figure 6:
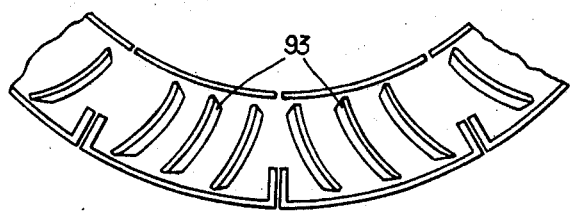
FIGURE 6 is a cross-section through the thrust reverser of FIGURE 1, transverse to the engine axis.

The flaps 63a in FIGURE 4 are arranged as described in FIGURES 5 to 7 in that they consist of a single peripheral row, pivoted transverse to the engine axis at their downstream ends. Their actuating means comprises rams 58 or the like, mounted adjacent said first actuating means, and pivotally connected to the inner surfaces of flaps 63a via one end of links 89, the other ends of which are mounted on multi wheeled carriages 90.

Carriages 90 are movable axially downstream or upstream along a guide track 91, the downstream end 92 of which forms a positive stop for the carriages. Thus when rams 58 are operated, the carriages 90 are pushed to the downstream end of the track 91, and this motion is translated into a pivoting movement of the flaps 63a, via the links 89, so that the flaps 63a adopt a position across the fan annulus as shown in dotted lines in FIGURE 4. Thus the flaps 63a turn the fan air flow radially outwards and the flaps 64a, 64b, 64c and 64d direct said fan air flow substantially forwards.

It will be appreciated that it is not necessary to have separate actuating means for the flaps 63a and the flaps 64a to 64d respectively. A lost motion linkage could be introduced whereby both sets of flaps would be operated by a common actuating means.

In FIGURE 6, vanes 93 (or other baffle means) are fitted in the lowest portion of cowl 52, with their longest sides extending axially across the gap bounded by flaps 63a and 64a to 64d respectively. The vanes 93 are curved so as to deflect substantially sideways, relative to the engine axis, that portion of the air which is ejected from the reverser nozzles in said lowest cowl portion, thus avoiding the blowing up of debris from the ground, into the air intake 55.

The inner flaps 63 and 63a may be hinged as at 94 near their upstream ends so that the upstream portions thereof may pivot relative to the downstream portions thereof, whereby to increase the area of the throat of the nozzle which is formed when flaps 63 or 63a are extended across the downstream portion of the fan annulus. This arrangement prevents chocking of the nozzle throat by allowing the said flaps to adopt a position further downstream than would be possible if said flaps were of rigid construction over their full length.

We claim:

1. A fan thrust reverser for a jet propulsion plant comprising a double walled casing having an inner wall and an outer wall; an inner casing spaced therefrom and defining an annular duct between said inner casing and said inner wall; a plurality of angularly spaced apart groups of radially aligned inner and outer thrust reverser flaps forming part of said double walled casing, the flaps of each said group being pivotally mounted adjacent their downstream ends and being movable between an inoperative position, in which said flaps are disposed substantially parallel to each other and merge into the remaining part of the double walled casing to provide portions of the inner and outer walls thereof, respectively, and an operative position in which their upstream ends respectively lie radially inwardly and outwardly of said inner and outer walls and open a peripheral gap in said double walled casing, said inner flaps extending across the annular duct and substantially completely obstructing said annular duct so that a gas stream passing downstream through said annular duct will pass through said peripheral gap in said double walled casing and will be deflected upstream by said flaps; a common ring member which is operably connected to each of said flaps and which is mounted for axial movement, said common ring member and said flaps being connected by linkage rods having one end pivotally attached to said common ring member and the other end thereof attached to said inner flap and said outer flap, respectively; ram means for moving said ring member axially to move said flaps between the inoperative and operative positions, said ram means being operably attached to said ring member by a rod; circumferentially spaced parallel rails and roller means fixedly attached to said common ring member and adapted to roll within said rails whereby the movement of said common ring member is guided by said rails.

2. A fan thrust reverser as claimed in claim 1 in which the said double walled casing is that of a fan mounted concentrically about and driven by a gas turbine engine, said inner casing being that of the gas turbine engine.

3. A fan thrust reverser as claimed in claim 2 in which the fan is a front fan.

4. A fan thrust reverser as claimed in claim 1 in which the upstream portions of the inner flaps are provided with sealing means which are adapted to effect a seal with the inner casing when the inner flaps are in the operative position.

5. A fan thrust reverser as claimed in claim 4 in which the sealing means comprise strips of flexible material.

6. A fan thrust reverser as claimed in claim 1 in which there is a sealing device to exclude fluid from the space between the walls of the double walled casing upstream of the said flaps.

7. A fan thrust reverser as claimed in claim 6 in which the said sealing device is a flexible bellows.

8. A fan thrust reverser for a jet propulsion plant comprising a double walled casing having an inner wall and an outer wall; an inner casing spaced therefrom and defining an annular duct between said inner wall and said inner casing; a plurality of annularly spaced apart groups of radially aligned inner and outer thrust reverser flaps forming part of said doubled walled casing, each group comprising a single inner flap and a plurality of outer flaps, the flaps of each said group being pivotally mounted adjacent their downstream end, said outer flaps having parallel axes of rotation, and being movable between an inoperative position, in which they are disposed substantially parallel to each other and merge into the remaining part of the double wall casing to provide portions of the inner and outer walls thereof, respectively, and an operative position in which their upstream ends respectively lie radially inwardly and radially outwardly of the said inner and outer walls and open a peripheral gap in the double walled casing, said inner flap extending across said annular duct and substantially completely obstructing said annular duct so that a gas stream passing downstream through said annular duct will pass through said peripheral gap in said double wall casing and will be deflected upstream by said flaps; means for moving each of said outer flaps in each said group between the operative and inoperative positions comprising a lever member fixedly attached at one end thereof to each said outer flap at a point coinciding with the axis of rotation of each said outer flap, said lever member being rotatable about said axis of rotation, and a first linkage member connected to each said lever member at the other end thereof such that longitudinal motion of said linkage member will cause rotation of said lever member thereby causing rotation of the outer flap associated therewith, said linkage members being connected in series to a first actuating means for causing longitudinal motion of said first linkage members; means for moving each of said inner flaps comprising a second linkage member having one end thereof pivotally attached to said inner flap, the other end of said second linkage member having a roller means attached thereto, a guide rail means upon which said roller means moves longitudinally and a ram means for causing longitudinal motion of said roller means thereby rotating said inner flap; and pivot means on each said inner flap for causing the upstream portion of each said inner flap to pivot relative to the downstream portion thereof.

9. The fan thrust reverser defined in claim 8 wherein said first and second actuating means are combined into a single actuating means operatively connected to said series connection of said first linkage members and to said roller means on said linkage member.

10. A fan thrust reverser as claimed in claim 8 in which baffle means are mounted at the lower portion of the peripheral gap in the double walled casing to deflect the gas stream to the side.

11. The fan thrust reverser of claim 1 having in addition bulkheads defining the upstream boundaries of said peripheral gaps, said bulkheads having slots allowing said linkage rods to pass therethrough, and a bellows having one end attached to said bulkheads and another end attached to said common ring members preventing air from entering said double walled casing when said flaps are in an operative position.

References Cited

UNITED STATES PATENTS

| | | | |
|---|---|---|---|
| 2,798,362 | 7/1957 | Rainbow et al. | 239—265.29 |
| 2,802,333 | 8/1957 | Price et al. | 60—229 |
| 2,945,346 | 7/1960 | Arnzen | 239—265.29 |
| 2,980,388 | 4/1961 | White | 251—298 |
| 3,036,431 | 5/1962 | Vdolek | 60—229 |
| 3,112,616 | 12/1963 | Adamson | 60—229 |
| 3,127,182 | 3/1964 | Wardleigh | 251—306 |
| 3,172,256 | 3/1965 | Kerry et al. | 60—229 |
| 3,279,182 | 10/1966 | Helmintoller | 60—229 |
| 3,333,793 | 8/1967 | Opfer et al. | 239—265.27 |
| 3,280,561 | 10/1966 | Kutney | 60—226 |

AL LAWRENCE SMITH, Primary Examiner

U.S. Cl. X.R.

60—226; 239—265.29